A. C. Moore,
Bit Stock.
No. 4,199. Reissued Dec. 13. 1870
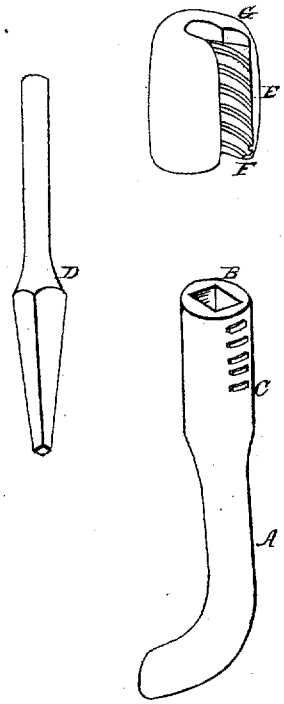
Witnesses: Edward E. Osborn, J. P. Crawford
A. C. Moore, Inventor
L. J. Brown for E. A. Muldon Assignee
By E. A. Owen his Atty

United States Patent Office.

LEVI J. GUNN AND CHARLES H. AMIDON, OF GREENFIELD, MASSACHUSETTS, ASSIGNEES OF A. C. MOORE.

Letters Patent No. 16,931 dated March 31, 1857; reissue No. 4,199, dated December 13, 1870.

IMPROVEMENT IN BIT-STOCKS

The Schedule referred to in these Letters Patent and making part of the same.

Be it known that I, A. C. MOORE, of Wilmington, in the county of Windham and State of Vermont, did invent certain new and useful Improvements in Securing Bits or other Boring Tools to a Bit-Stock or Brace, of which the following is a specification.

The said invention consists in applying a plane socket to any of the known forms of stock, into which the square head or tang of a bit or tool is inserted without any previous fitting, except to center the bit, and grasped and held by a cap, which screws firmly upon the shoulder of the tang of the bit.

*Description of the Drawing.*

A is a view of the end of a bit-stock, showing the socket to receive the bit.

D is a view of the end of a bit which fits into the socket.

E represents the cap or nut which fits over the end of the stock.

*General Description.*

A represents the socket end of the stock cut off just back of the first turn of the stock, and B, the socket to receive the tang of the bit.

C is a screw cut upon the circumference of the socket, and

D represents the tang and part of the spindle of an ordinary bit.

The sleeve or nut E is tapped or threaded, as shown at G, to fit the screw upon the socket, and a longitudinal slot is cut in it which embraces the round or spindle-part of the bit.

The stock operates as follows:

The nut E is removed from the socket B, and the square tang of the bit or tool D is inserted in the socket B. The nut E is then placed upon the round or spindle-part of the bit, the opening in the end of the nut being made of the proper size to receive the spindles of ordinary bits. The cap or sleeve E is then moved along the spindle, the slot in it sliding over the segment of the screw C until the inner part of the end of the cap E comes in contact with the tang of the bit. A turn of the cap E will grasp and hold the tang of the bit or tool firmly and sufficiently true for all ordinary purposes without any previous fitting of the tangs to the socket.

What is claimed as the invention of A. C. MOORE, is—

1. The stock or tool-holder herein described, consisting of the barrel A, provided with screw-thread C, socket B, and nut E, constructed, arranged, and operating in the manner described and specified.

2. The barrel A, provided with socket B and screw-segment C, in combination with the slotted nut E, constructed and operating in the manner described and specified.

LEVI J. GUNN.
CHARLES H. AMIDON.

Witnesses:
G. EDGERTON,
D. P. ABERCROMBIE.